(12) United States Patent
Seo et al.

(10) Patent No.: US 9,436,776 B2
(45) Date of Patent: Sep. 6, 2016

(54) WEB BROWSING SYSTEM AND METHOD FOR RENDERING DYNAMIC RESOURCE URIS USING SCRIPT

(75) Inventors: Sung-Jong Seo, Hwaseong-si (KR);
Sung-Hak Lee, Yongin-si (KR);
Dong-Woo Im, Yongin-si (KR);
Hyo-Jung Song, Seoul (KR);
Seung-Mo Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 552 days.

(21) Appl. No.: 13/169,263

(22) Filed: Jun. 27, 2011

(65) Prior Publication Data

US 2012/0059869 A1    Mar. 8, 2012

(30) Foreign Application Priority Data

Sep. 6, 2010 (KR) .................. 10-2010-0087165

(51) Int. Cl.
*G06F 17/30* (2006.01)
(52) U.S. Cl.
CPC .............. *G06F 17/30893* (2013.01)

(58) Field of Classification Search
USPC ............................................ 709/202
See application file for complete search history.

(56) References Cited

U.S. PATENT DOCUMENTS

| | | | | |
|---|---|---|---|---|
| 6,631,512 | B1* | 10/2003 | Onyeabor | 717/100 |
| 7,047,485 | B1* | 5/2006 | Klein et al. | 715/205 |
| 2004/0187077 | A1* | 9/2004 | Bhogal | G06F 17/3089 715/243 |
| 2006/0129766 | A1* | 6/2006 | Cassia et al. | 711/137 |
| 2010/0325263 | A1* | 12/2010 | Raja et al. | 709/224 |

OTHER PUBLICATIONS

Korean Office Action issued on Jun. 21, 2016 in counterpart Korean Application No. 10-2010-00871165. (6 pages in Korean with English translation).

* cited by examiner

*Primary Examiner* — Angela Nguyen
(74) *Attorney, Agent, or Firm* — NSIP Law

(57) ABSTRACT

A method of communicating with a web server for web browsing, and an apparatus and system to perform the method, is provided. The method includes extracting resource information from script included in web page information, transmitting the resource information to the web server to request a resource corresponding to the resource information, and storing the resource.

16 Claims, 8 Drawing Sheets

FIG. 7

Simple URI Example :

```
<script type="text/javascript">
    ~ ~ ~ ~
    obj = document.createElement('script');
700 ─┤ obj.src = 'http://testurl.test/open.js';
    ~ ~ ~ ~
    document.body.appendchild(obj);
</script>
```

Complex URI Example :

```
function B(odd) {
    ~ ~ ~ ~
    obj = document.createElement('script');
710 ─┤ obj.src = 'http://testurl.test/test' + odd + '.js';
    ~ ~ ~ ~
    document.body.appendchild(obj);
}
function A() {
    ~ ~ ~ ~
    odd = 1;
    ~ ~ ~ ~
    B(odd);
    ~ ~ ~ ~
}
```

WEB BROWSING SYSTEM AND METHOD FOR RENDERING DYNAMIC RESOURCE URIS USING SCRIPT

CROSS-REFERENCE TO RELATED APPLICATION

This application claims the benefit under 35 U.S.C. §119 (a) of Korean Patent Application No. 10-2010-0087165, filed on Sep. 6, 2010, in the Korean Intellectual Property Office, the entire disclosure of which is incorporated herein by reference for all purposes.

BACKGROUND

1. Field

The following description relates to a web browsing system and method for rendering dynamic resource URIs including script, and more particularly, to a system for receiving web pages (for example, HTML, script, etc.) through a web browser and rendering external resources requested by script language or external script resource links included in the web pages, and a method of reducing a web page loading time required to load web pages in a device in which the system is installed.

2. Description of the Related Art

Analysis on sites requiring long web page loading times among a top 100 sites (as surveyed from www.alexa.com) has shown that increases in loading times due to network delay are responsible for at least 25% to 50% or more of the entire loading times. Efforts to reduce web page loading times through performance improvement of browsers are being made. However, reducing web page loading times by minimizing unnecessary network delay may be considered more important.

Recently, multicores have become popular, but results of studies regarding web browsers which may make efficient use of multicores are still insufficient. An increase in loading times of web pages also increases times for which CPUs stay in an idle state.

In order to minimize network delay due to resource URIs requested by script, and thereby to improve the loading speed of web pages, a method of preloading resources requested by web pages is needed.

Conventionally, static resource URIs existing as constant strings in a predetermined format in a markup-language document could be preloaded. However, since recent web pages intend to include resource URIs that are dynamically created by a script language, preloading only static resource URIs is inefficient in reducing loading times.

SUMMARY

The following description relates to a method of minimizing a delay time upon reception of resources by searching for resource URIs that can be requested by cores having a CPU in an idle state in a multicore environment and requesting the found resource URIs from a web server to preload the resource URIs.

The following description also relates to a method of improving a web page loading speed by minimizing a network delay time due to resource URIs requested by script.

In one general aspect, there is provided a web browsing system which connects to a web server to receive and transmit one or more documents and/or files from and to the web server, and which processes dynamic resource information using script, including a rendering engine configured to display a web page based on the one or more documents and/or files received from the web server a script analyzer configured to analyze the script included in the web page to be displayed and extract resource information from the script and a resource processor configured to transmit the resource information to the web server to request a resource corresponding to the resource information from the web server, and to store the resource received from the web server.

The rendering engine may display the web page using a resource acquired by parsing the web page or from the resource information.

The script analyzer may include a resource information searching unit configured to search for a position at which the resource information is capable of being extracted from the script included in the web page, a resource information determining unit configured to determine whether the resource information extracted at the found position is a simple URI or a complex URI, and a resource information confirming unit configured to trace, in response to the resource information being a complex URI, a dynamic variable used in the complex URI to acquire dynamic resource information, and to confirm the acquired dynamic resource information as resource information corresponding to the complex URI.

The resource processor may include a resource information searching unit configured to search for a position at which the resource information is capable of being extracted from the script included in the web page, a resource information determining unit configured to determine whether the resource information extracted at the found position is a simple URI or a complex URI, and a resource information confirming unit configured to trace, in response to the resource information being a complex URI, a dynamic variable used in the complex URI to acquire dynamic resource information, and to confirm the acquired dynamic resource information as resource information corresponding to the complex URI.

In response to the resource information being a simple URI, the resource information determining unit may transfer the simple URI to the resource processor to request a resource corresponding to the simple URI from the web server.

If the acquired dynamic resource information exceeds a predetermined threshold value in response to tracing the dynamic variable used in the complex URI to acquire the corresponding dynamic resource information, the resource information confirming unit may discard the acquired dynamic resource information.

The resource information confirming unit transfers the acquired dynamic resource information to the resource processor to request a resource corresponding to the acquired dynamic resource information from the web server.

In response to one or more pieces of dynamic resource information being acquired, the resource information confirming unit may assign priorities to the acquired dynamic resource information according to probability that the acquired dynamic resource information is called by a function or jump statement included in the complex URI, and may confirm resource information having high priority among the acquired dynamic resource information as the resource information corresponding to the complex URI.

The rendering engine may search for a resource for displaying the web page from the resource storage, and may request, in response to the resource for displaying the web page not existing in the resource storage, the resource for displaying the web page from the web server through the resource requesting unit.

The rendering engine and the script analyzer may be executed in different cores in a computing system in which the web browsing system is installed.

In another general aspect, there is provided a web browsing method to communicate with a web server to receive and transmit one or more documents and/or files from and to the web server, the method including determining whether a resource received from the web server is a storable resource or a non-storable resource, displaying, in response to the received resource being a non-storable resource, a web page using the resource, storing, in response to the received resource being a storable resource, the resource, analyzing script included in the resource to extract resource information from the script, and acquiring a resource corresponding to the resource information from the web server using the resource information, and displaying a web page using the resource corresponding to the resource information.

The web browsing method may further include determining whether script exists in the storable resource, extracting, in response to the script existing in the storable resource, the resource information from the script, and requesting the resource corresponding to the resource information from the web server to acquire the resource corresponding to the resource information in advance of displaying the web page.

The analyzing of the script included in the resource to extract the resource information from the script may include searching for a position at which the resource information is capable of being extracted from the script included in the resource, determining whether the resource information extracted at the found position is a simple URI or a complex URI, and acquiring, in response to the resource information being a simple URI, the resource corresponding to the resource information from the web server.

The web browsing method may further include tracing, in response to the resource information being a complex URI, a dynamic variable used in the complex URI to acquire at least one piece of dynamic resource information, assigning priority to the at least one piece of dynamic resource information according to probability that the dynamic resource information is called by a function or jump statement included in the complex URI, and confirming the dynamic resource information having high priority as resource information corresponding to the complex URI.

The web browsing method may further include discarding the dynamic resource information if the dynamic resource information acquired by tracing the dynamic variable used in the complex URI exceeds a predetermined threshold value.

In another general aspect, there is provided a web browsing apparatus which communicates with a web server, including a script analyzer to extract resource information from script included in web page information, and a resource processor to transmit the resource information to the web server to request a resource corresponding to the resource information, and to store the resource.

The web browsing apparatus may further include a rendering engine to display a web page based on the web page information and the resource stored by the resource processor.

In another general aspect, there is provided a method of communicating with a web server, the method including extracting, at a terminal device, resource information from script included in web page information, transmitting the resource information from the terminal device to the web server to request a resource corresponding to the resource information, and storing the resource at the terminal device.

The method may further include displaying a web page on the terminal device based on the web page information and the stored resource.

The method may further include displaying a web page on the terminal device based on the web page information and a non-storable resource corresponding to the resource information.

Therefore, by predicting resource URIs that can be requested by script using CPU resources that are in an idle state, and optionally requesting the predicted resource URIs from a web server according to their priorities, resources may be directly used as necessary without an additional delay time.

Furthermore, by minimizing unnecessary time delay upon loading web pages, an actual loading time may be reduced.

Other features and aspects will be apparent from the following detailed description, the drawings, and the claims.

BRIEF DESCRIPTION OF THE DRAWINGS

FIG. 7 illustrates examples of resources acquired by script.

Figure 1:
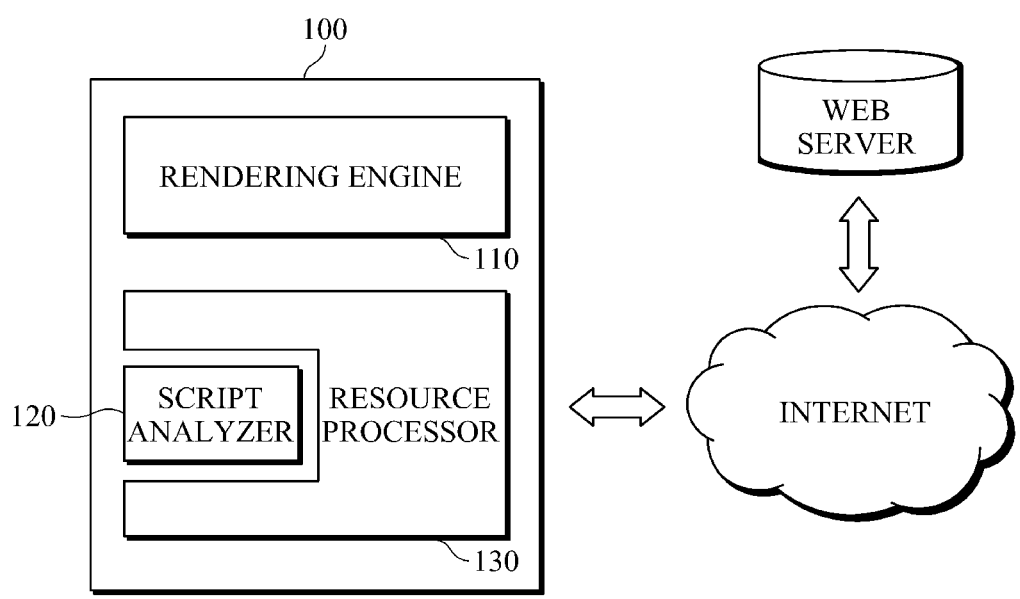
FIG. 1 illustrates an internet environment in which a web browsing system is included.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an internet environment in which a web browsing system 100 is included. Referring to FIG. 1, the web browsing system 100 may include a rendering engine 110, a script analyzer 120, and a resource processor 130.

In the internet environment, the web browsing system 100 may be connected to a web server. Such a connection may be wired or wireless at any of various points between the web browsing system 100 and the web server. The web browsing system 100 may request resources from the web server, and the web server may transmit the requested resources to the web browsing system 100, through an internet network.

The rendering engine 110 may display a web page based on a document or a file received from the web server. The web page may be displayed on any of a number of various terminal devices.

The script analyzer 120 may analyze script included in the web page to be displayed to extract resource information from the script.

The resource processor 130 may transmit the resource information to the web server to request resources corresponding to the resource information from the web server, and may store the resources transmitted from the web server. The storage in which the transmitted resources may be stored may be provided within the resource processor 130, or as an independent storage accessed by the resource processor.

In more detail, in an example in which a user selects a web page to be displayed, the rendering engine 110 may transfer information about the web page to the script analyzer 120, and the script analyzer 120 may analyze script included in the web page to extract resource information from the script.

The resource information may be transmitted to the web server through the resource processor 130 to request the corresponding resources from the web server. Then resource processor 130 may receive the resources from the web server and may store resources therein. The rendering engine 110 may display a web page using a resource storing the web page and a resource received in real time from a web server.

Figure 2:
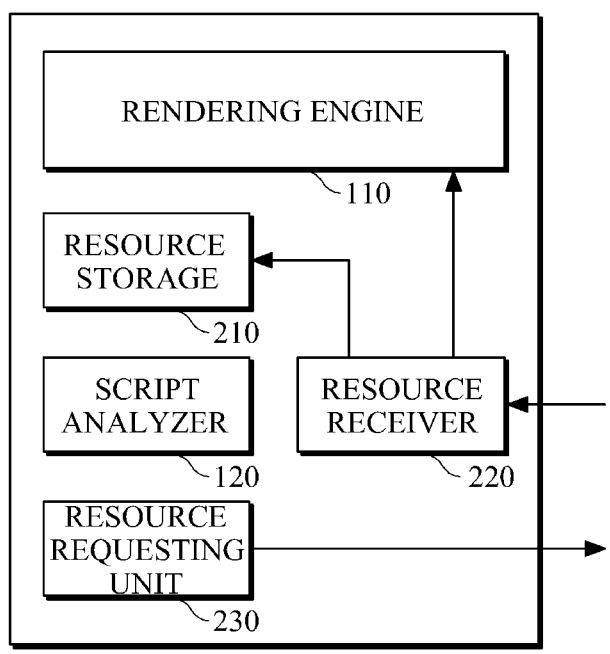
FIG. 2 is a diagram illustrating an example of a web browsing system.

FIG. 2 is a diagram illustrating an example of a web browsing system. Referring to FIG. 2, the web browsing system may include a rendering engine 110, a script analyzer 120, a resource storage 210, a resource receiver 220, and a resource requesting unit 230. The resource storage 210, resource receiver 220, and/or resource requesting unit 230 may be provided together as the resource processor 130 of FIG. 1, or as separate units.

One aspect in which the web browsing system illustrated in FIG. 2 is different from the web browsing system 100 illustrated in FIG. 1 is that several functions of the resource processor 130 illustrated in FIG. 1 have independent configurations.

The resource requesting unit 230 may request resources from a web server using resource information extracted by the script analyzer 120, and the resource receiver 220 may receive the requested resources from the web server. The resource storage 210 may store the received resources.

The rendering engine 110 may search for the requested resources from the resource storage 210 by parsing, script execution, etc, and may use the found resources to display a web page.

If the corresponding resources are not found in the resource storage 210, the rendering engine 110 may instruct the resource requesting unit 230 to request the resources from the web server.

In a single-core system, the script analyzer 120 may operate in an idle CPU, and in a multi-core system, the script analyzer 120 may operate in an idle CPU that is different from a core in which the rendering engine 110 operates, so as to not interrupt the operation of the rendering engine 110.

Figure 3:
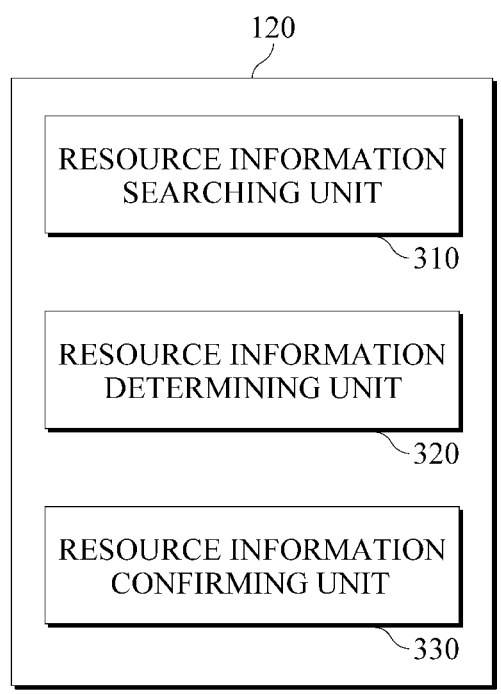
FIG. 3 is a diagram illustrating an example of a script analyzer included in the web browsing system illustrated in FIG. 2.

FIG. 3 is a diagram illustrating an example of the script analyzer 120 included in the web browsing system illustrated in FIG. 2. Referring to FIG. 3, the script analyzer 120 may include a resource information searching unit 310, a resource information determining unit 320, and a resource information confirming unit 330.

The script analyzer 120 may analyze script included in a web page that is to be displayed to extract resource information from the script. Hereinafter, an example of a process in which the individual components of the scrip analyzer 120 operate to analyze script will be described in more detail.

The script analyzer 120 may analyze script by a pattern matching method, a back-trace method, etc.

The resource information searching unit 310 may search for a resource request position at which resource information can be extracted from script included in a web page. The resource request position may be searched for using, for example, a script instruction, or other searching techniques. In more detail, the resource request position may be searched for through attribute definition (for example, innerHTML, src, etc.) or a DOM method call (for example, appendchild, insertBefore, etc.) of an element node, or writeHTML of a document node, or the like.

The resource information (resource URI) extracted at the resource request position may be a simple URI or a complex URI. Examples of simple and complex URIs will be described in more detail with reference to FIG. 7, which is discussed later in this description.

Whether the resource information extracted at the resource request position is a simple URI or a complex URI may be determined by the resource information determining unit 320.

In an example in which the resource information is a complex URI, the resource information confirming unit 330 may trace a dynamic variable used in the complex URI to acquire resource information, and may confirm the acquired resource information as resource information corresponding to the complex URI.

Figure 4:
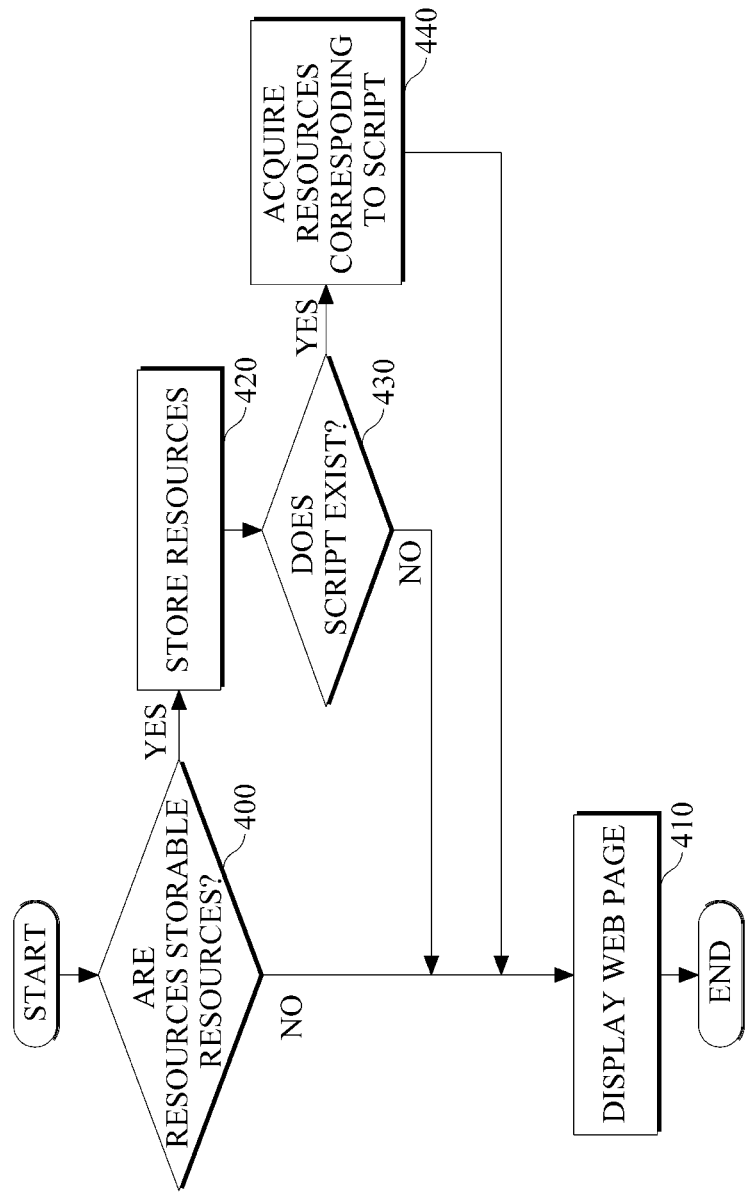
FIG. 4 is a flowchart illustrating an example of a method by which the web browsing system operates.

FIG. 4 is a flowchart illustrating an example of a method by which the web browsing system operates.

The web browsing system of this example may repeat receiving/processing/outputting/waiting operations until resources requested through the rendering engine (110 of FIGS. 1 and 2) are all received.

In response to the requested resources being all received, it may be determined whether the resources are storable resources (400). If the resources are non-storable resources, that is, if the resources are not able to be stored for one or more reasons which may be related to the web browsing system, the source of the resources, etc., the rendering engine 110 may appropriately render the resources to display a web page (410).

If the resources are storable resources, the resources may be stored (420) in the resource storage (210 of FIG. 2), and it may be determined whether script exists in the stored resources (430). If script exists, resources corresponding to the script may be acquired (440), and a web page may be displayed using the stored resources and the sources corresponding to the acquired script (410).

If no script exists in the stored resources, a web page may be displayed simply using the stored resources (410).

Figure 5:
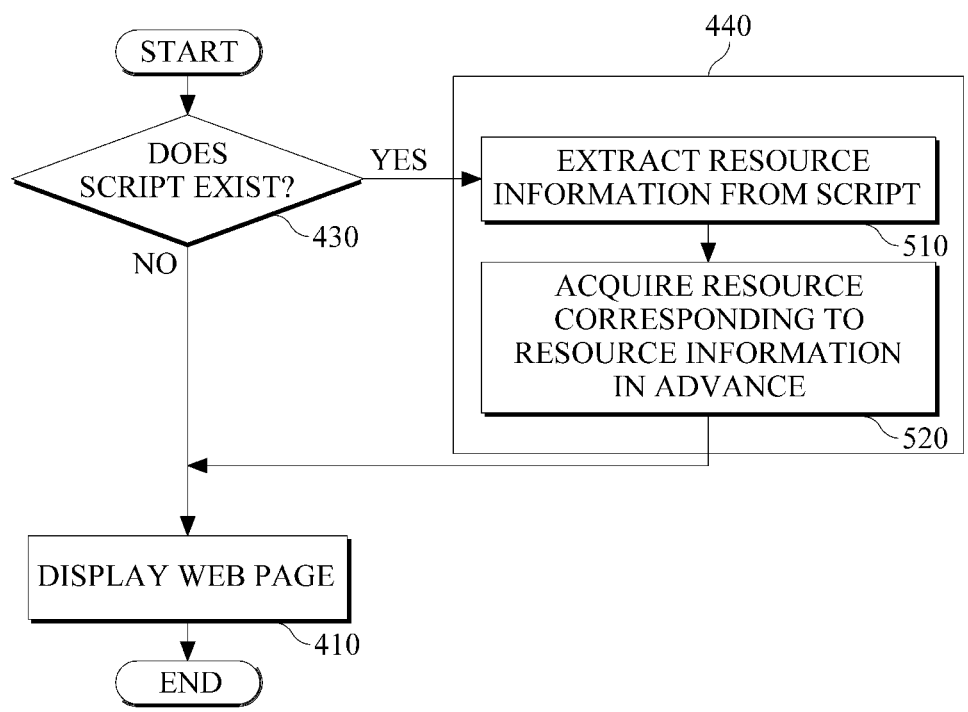
FIG. 5 is a flowchart illustrating an example of an operation of acquiring resources in the method illustrated in FIG. 4.

FIG. 5 is a flowchart illustrating an example of the operation 440 of acquiring resources corresponding to the script in the method illustrated in FIG. 4.

If it is determined in operation 430 that script exists in the already required resources, resource information may be extracted from the script (510), and the resource information may be transmitted to a web server to preload the resources corresponding to the resource information from the web server (520). After the resources corresponding to the resource information existing in the script are acquired, a web page can be displayed using necessary resources among the acquired resources (410).

Figure 6A:
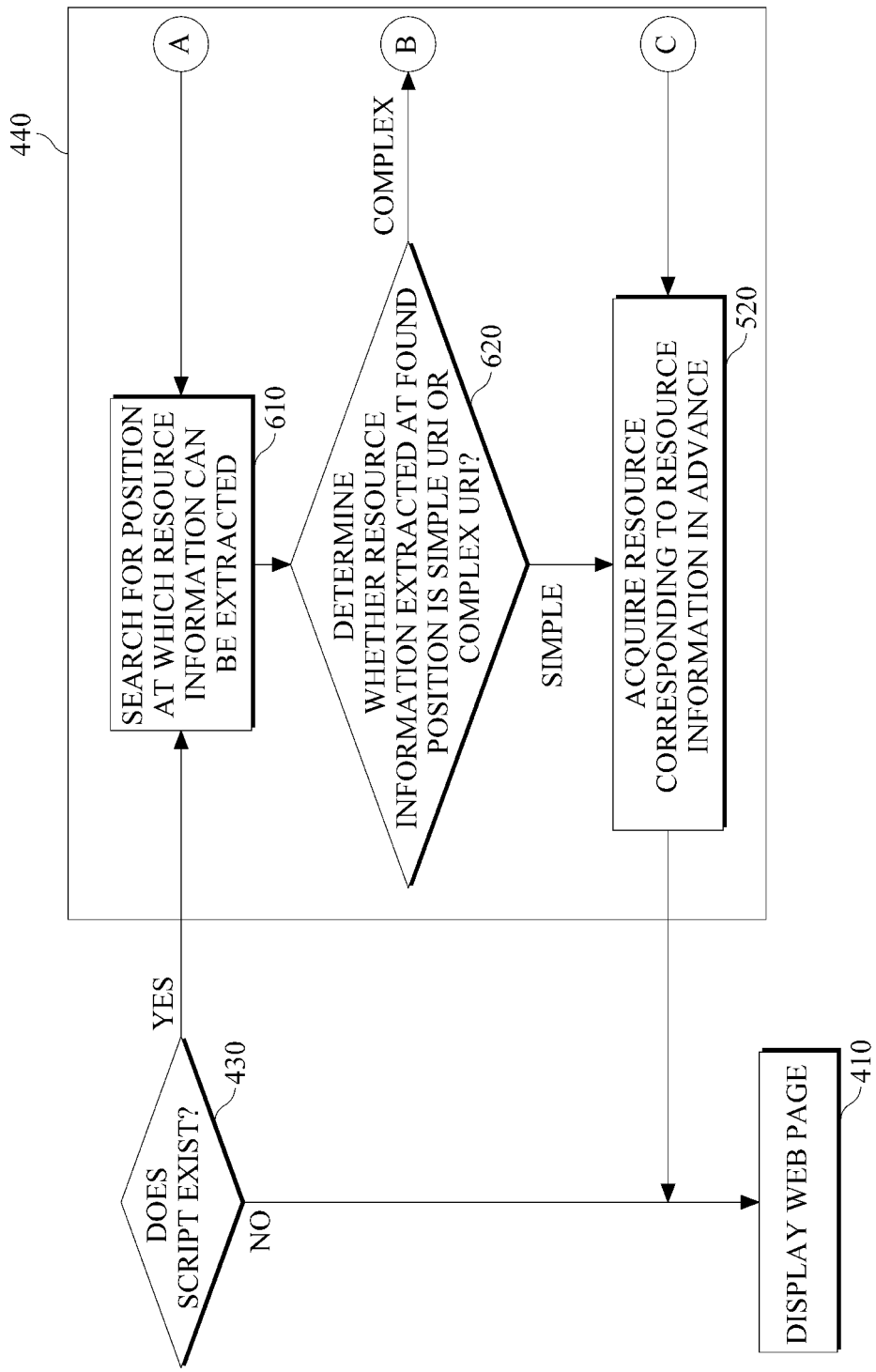
FIGS. 6A and 6B are flowcharts illustrating another example of the operation of acquiring resources in the method illustrated in FIG. 4.
Figure 6B:
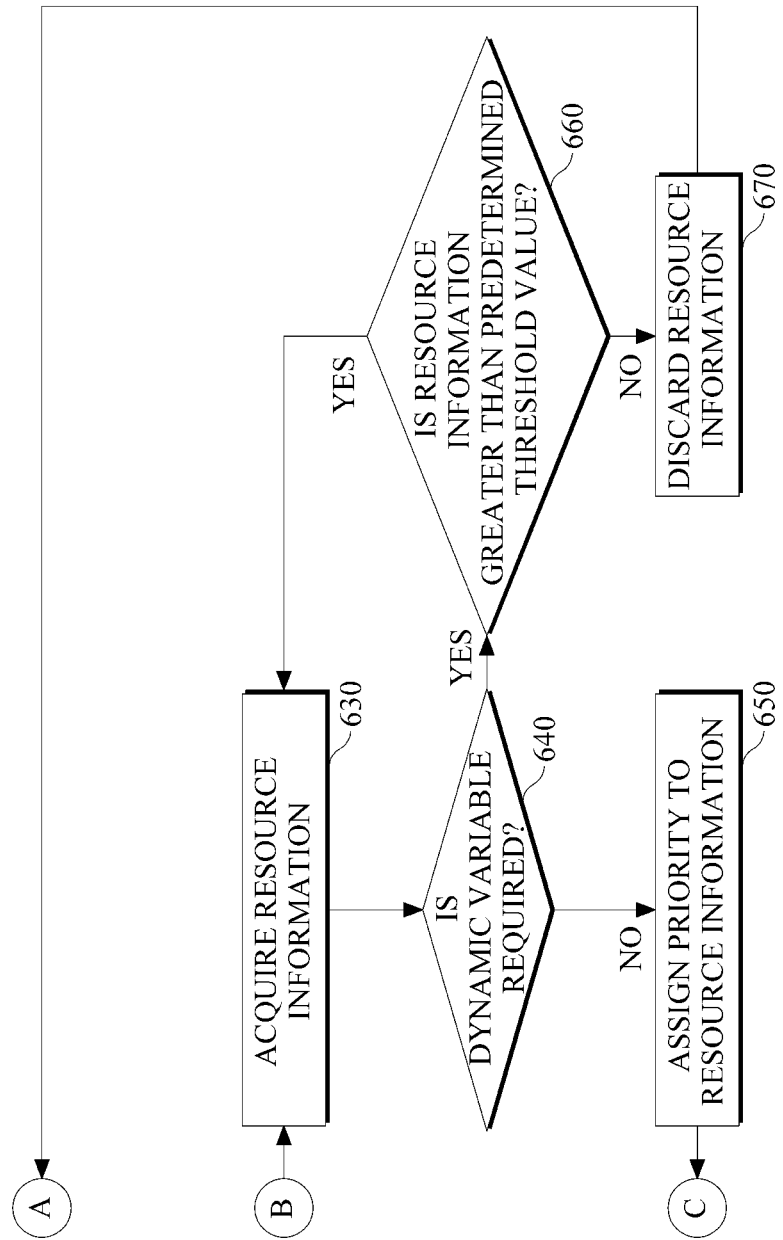

FIGS. 6A and 6B are flowcharts illustrating another example of the operation 440 of acquiring resources in the method illustrated in FIG. 4.

A position at which resource information can be extracted may be searched for from script included in a web page that is to be displayed (610).

It may be determined whether the resource information extracted at the found position is a simple URI or a complex URI (620). If the resource information is a simple URI, the resource information may be transmitted to a web server to acquire the corresponding resources (520). If the resource information is a complex URI, a dynamic variable used in the complex URI may be traced to acquire at least one piece of dynamic resource information (630). It may be determined whether the dynamic variable is required (640). In this example, the term dynamic resource information refers to resource information corresponding to a dynamic variable used in the complex URI. Priority may be assigned to the acquired dynamic resource information according to a probability that the acquired dynamic URI resource information may be called by a function or jump statement included in the complex URI (650). Resource information having higher priority among the acquired dynamic resource information may be confirmed as resource information corresponding to the complex URI, and resources corresponding to the confirmed resource information may be acquired (520).

In response to the dynamic variable used in the complex URI being traced to acquire at least one piece of dynamic resource information, it may be determined whether an amount of the acquired dynamic resource information is greater than a predetermined threshold value (660). If the amount of the acquired dynamic resource information is greater than the predetermined threshold value, the acquired dynamic resource information may be discarded (670) and the process may return to the operation 610 of searching for a position at which resource information can be extracted.

In other words, a complex URI may be acquired by calling the corresponding variables using dynamic variables. However, the complex URI may become too complex in an example in which too many or long variables have to be called. In this case, a time consumed to analyze the complex URI may be extended to an unsatisfactory degree, which eliminates the advantage of preloading resources to reduce a loading time. In the case of such resources, since it may be more advantageous in terms of system efficiency to request and receive the resources in real time, the current example may set a threshold value and discard resource information exceeding the threshold value without loading it.

FIG. 7 illustrates examples of resources acquired by script, wherein the resources are a simple URI and a complex URI.

FIG. 7 corresponds to an example of a java script code. The simple URI is a URI whose address can be expressed by constant strings or their combination, and the complex URI is a URI whose address can be expressed by a combination of constant strings and variables or by a combination of variables.

Script expressed in this way may be analyzed to search for resource request positions 700 and 710, and a simple URI and a complex URI may be acquired from the found resource request positions 700 and 710.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, a terminal device described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A web browsing apparatus connected to a web server to receive and transmit one or more documents and/or files from and to the web server, and which processes dynamic resource information using script, comprising:
   a rendering engine configured to display a web page based on the one or more documents and/or files received from the web server;
   a script analyzer configured to analyze the script included in the web page to be displayed and extract resource information from the script; and a resource processor configured to transmit the resource information to the web server to request a resource corresponding to the resource information from the web server, and to store the resource received from the web server, wherein the resource information exceeding a threshold is discarded without loading the resource information, wherein the script analyzer determines whether a URI is a simple or complex URI and determines a dynamic variable, and a resource information confirming unit configured to trace, in response to the resource information being a complex URI, a dynamic variable used in the complex URI to acquire dynamic resource information, and to confirm the acquired dynamic resource information as resource information corresponding to the complex URI.

2. The web browsing apparatus of claim 1, wherein the rendering engine displays the web page using a resource acquired by parsing the web page or from the resource information.

3. The web browsing apparatus of claim 1, wherein the script analyzer comprises:
a resource information searching unit configured to search for a position at which the resource information is capable of being extracted from the script included in the web page;
a resource information determining unit configured to determine whether the resource information extracted at the found position is a simple URI or a complex URI.

4. The web browsing apparatus of claim 1, wherein the resource processor comprises:
a resource requesting unit configured to request the resource from the web server using the resource information;
a resource receiver configured to receive the resource from the web server; and
a resource storage configured to store the received resource.

5. The web browsing apparatus of claim 1, wherein the rendering engine and the script analyzer are executed in different cores in a computing system in which the web browsing apparatus is installed.

6. The web browsing apparatus of claim 3, wherein, in response to the resource information being a simple URI, the resource information determining unit transfers the simple URI to the resource processor to request a resource corresponding to the simple URI from the web server.

7. The web browsing apparatus of claim 3, wherein in response to the acquired dynamic resource information exceeding a threshold value in response to tracing the dynamic variable used in the complex URI to acquire the corresponding dynamic resource information, the resource information confirming unit discards the acquired dynamic resource information.

8. The web browsing apparatus of claim 3, wherein the resource information confirming unit transfers the acquired dynamic resource information to the resource processor to request a resource corresponding to the acquired dynamic resource information from the web server.

9. The web browsing apparatus of claim 3, wherein in response to one or more pieces of dynamic resource information being acquired, the resource information confirming unit assigns priorities to the acquired dynamic resource information according to probability that the acquired dynamic resource information is called by a function or jump statement included in the complex URI, and confirms resource information having high priority among the acquired dynamic resource information as the resource information corresponding to the complex URI.

10. The web browsing apparatus of claim 4, wherein the rendering engine searches for a resource for displaying the web page from the resource storage, and requests, in response to the resource for displaying the web page not existing in the resource storage, the resource for displaying the web page from the web server through the resource requesting unit.

11. A web browsing apparatus which communicates with a web server, comprising:
a script analyzer configured to extract resource information from script included in web page information; and
a resource processor configured to transmit the resource information to the web server to request a resource corresponding to the resource information, and to store the resource wherein the resource information exceeding a threshold is discarded without loading the resource information,
wherein the script analyzer determines whether a URI is a simple or complex URI and determines a dynamic variable,
and a resource information confirming unit configured to trade, in response to the resource information being a complex URI, a dynamic variable used in the complex URI to acquire dynamic resource information, and to confirm the acquired dynamic resource information as resource information corresponding to the complex URI.

12. The web browsing apparatus of claim 11, further comprising a rendering engine to display a web page based on the web page information and the resource stored by the resource processor.

13. A method of communicating with a web server, the method comprising:
extracting, at a terminal device, resource information from script included in web page information;
transmitting the resource information from the terminal device to the web server to request a resource corresponding to the resource information;
storing the resource at the terminal device wherein the resource information exceeding a threshold is discarded without loading the resource information,
determining whether a URI is a simple or complex URI and determining a dynamic variable; and
tracing, in response to the resource information being a complex URI, a dynamic variable used in the complex URI to acquire dynamic resource information, and to confirm the acquired dynamic resource information as resource information corresponding to the complex URI.

14. The method of claim 13, further comprising displaying a web page on the terminal device based on the web page information and the stored resource.

15. The method of claim 14, further comprising displaying a web page on the terminal device based on the web page information and a non-storable resource corresponding to the resource information.

16. A web browsing apparatus connected to a web server to receive and transmit one or more documents and/or files from and to the web server, and which processes dynamic resource information using script, comprising:
a rendering engine configured to display a web page based on the one or more documents and/or files received from the web server;

a script analyzer configured to analyze the script included in the web page to be displayed and extract resource information from the script, the script analyzer comprises a resource information searching unit configured to search for a position at which the resource information is capable of being extracted from the script included in the web page;

a resource information determining unit configured to determine whether the resource information extracted at the found position is a simple URI or a complex URI; and a resource information confirming unit configured to trace, in response to the resource information being a complex URI, a dynamic variable used in the complex URI to acquire dynamic resource information, and to confirm the acquired dynamic resource information as resource information corresponding to the complex URI; and a resource processor configured to transmit the resource information to the web server to request a resource corresponding to the resource information from the web server, and to store the resource received from the web server.

* * * * *